(12) United States Patent
Tsay et al.

(10) Patent No.: US 12,498,020 B2
(45) Date of Patent: Dec. 16, 2025

(54) CONJUGATE CAM REDUCER

(71) Applicant: National Sun Yat-Sen University, Kaohsiung (TW)

(72) Inventors: Der-Min Tsay, Kaohsiung (TW); Kun-Lung Hsu, Kaohsiung (TW); Wei-Ming Chen, Kaohsiung (TW); Jyun-Ting Chen, Kaohsiung (TW); Yuan-Shin Lin, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 0 days.

(21) Appl. No.: 18/945,811

(22) Filed: Nov. 13, 2024

(65) Prior Publication Data

US 2025/0067321 A1    Feb. 27, 2025

Related U.S. Application Data

(63) Continuation-in-part of application No. 18/065,515, filed on Dec. 13, 2022, now abandoned.

(30) Foreign Application Priority Data

Jul. 25, 2022    (TW) ................................. 111127763

(51) Int. Cl.
    *F16H 1/32*      (2006.01)
    *F16H 25/06*      (2006.01)
    *F16H 53/00*      (2006.01)

(52) U.S. Cl.
    CPC ............... *F16H 1/32* (2013.01); *F16H 25/06* (2013.01); *F16H 53/00* (2013.01)

(58) Field of Classification Search
    CPC ......... F16H 2025/063; F16H 2001/324; F16H 2025/066; F16H 25/06
    See application file for complete search history.

(56) References Cited

U.S. PATENT DOCUMENTS

| | | | |
|---|---|---|---|
| 4,282,777 A | 8/1981 | Ryffel et al. | |
| 4,643,047 A | 2/1987 | Distin et al. | |
| 4,829,851 A * | 5/1989 | Imase ................ | F16H 25/06 475/168 |
| 5,197,930 A * | 3/1993 | Imase ................ | F16H 25/06 475/168 |
| 8,298,110 B2 | 10/2012 | Schüler | |
| 9,005,065 B2 | 4/2015 | Huang et al. | |

* cited by examiner

*Primary Examiner* — Derek D Knight
(74) *Attorney, Agent, or Firm* — Merchant & Gould P.C.

(57) ABSTRACT

A conjugate cam reducer includes input and output units disposed at two opposite sides of a transmission unit along an output axis. The transmission unit includes input-side and output-side cam discs having first and second grooved surfaces. The input unit includes an input disc having a plurality of first receiving grooves registered with the first grooved surfaces to receive input rollers, and an eccentric shaft rotated to drive rotation of the transmission unit in an eccentric cam motion. The output unit includes an output disc having an inner peripheral wall which engages with the output-side cam disc, and a plurality of second receiving grooves which are registered with the second grooves to receive output rollers. An outer diameter of each first toothed surface and an outer diameter of each second toothed surface is gradually increased along a direction parallel to the output axis.

8 Claims, 7 Drawing Sheets

CONJUGATE CAM REDUCER

CROSS-REFERENCE TO RELATED APPLICATION

This is a continuation-in-part application of U.S. patent application Ser. No. 18/065,515, filed on Dec. 13, 2022, which claims priority to Taiwanese Invention patent application No. 111127763, filed on Jul. 25, 2022.

FIELD

The disclosure relates to a speed reduction transmission device, and more particularly to a conjugate cam reducer.

BACKGROUND

Referring to FIGS. 1 and 2, a conventional cycloid speed reducer 1 as disclosed in TWI738015 includes an input shaft 11, a cycloid disc 12 sleeved on the input shaft 11, a first roller assembly 13 surrounding the cycloid disc 12, and a second roller assembly 14 coupled with the cycloid disc 12. The input shaft 11 has an eccentric portion 112. The cycloid disc 12 includes an inner race portion 121 which defines an axial hole 120 for the eccentric portion 112 to be mounted therein, and an outer race portion 122 which is radially spaced apart from the inner race portion 121. The outer race portion 122 has an outer peripheral wall 123 formed with a plurality of outer grooves 128, and an inner peripheral wall 124 formed with a plurality of inner grooves 129. The curvature of each outer groove 128 is smaller than the curvature of each inner groove 129 such that the outer and inner grooves 128, 129 have different arc lengths.

The first roller assembly 13 includes a first disc 131 formed with a plurality of first grooves 130 in an inner peripheral wall thereof, and a plurality of first rollers 132 respectively received in the first grooves 130 and disposed in the outer grooves 128. The second roller assembly 14 includes a second disc 141 formed with a plurality of second grooves 140 in an outer peripheral wall thereof, and a plurality of second rollers 142 respectively received in the second grooves 140 and disposed in the inner grooves 129. The first and second rollers 132, 142 are in the same form. By the outer grooves 128 having a different sliding path from that of the inner grooves 129, and the eccentric portion 112 of the input shaft 11, the cycloid speed reducer performs speed reduction transmission.

However, such cycloid speed reducers have a complicated structure. The first and second discs 131, 141 must be formed with the first and second grooves 130, 140 in a precise manner for accurate mounting of the first and second rollers 132, 142 in the grooves. Moreover, the cycloid disc 12 has the inner grooves 129 and the outer grooves 128 formed in the inner and outer peripheral walls, which is complicated and inconvenient to machine and results in difficulty in miniaturizing the product.

SUMMARY

Therefore, an object of the disclosure is to provide a conjugate cam reducer that can alleviate at least one of the drawbacks of the prior art.

According to the disclosure, the conjugate cam reducer includes a transmission unit defining an axial hole which extends along an output axis, and an input unit and an output unit which are connected with the transmission unit and respectively disposed at two opposite sides of the transmission unit along the output axis. The transmission unit includes an input-side cam disc and an output-side cam disc which extends from a side of the input-side cam disc along the output axis and which has an outer diameter larger than that of the input-side cam disc. The input-side cam disc has a plurality of first toothed surfaces which are formed circumferentially, angularly and equidistantly spaced apart from one another, and a plurality of first grooved surfaces each of which engages two adjacent ones of the first toothed surfaces. The output-side cam disc has a plurality of second toothed surfaces which are formed circumferentially, angularly and equidistantly spaced apart from one another, and a plurality of second grooved surfaces each of which engages two adjacent ones of the second toothed surfaces. An outer diameter of each of the first toothed surfaces and the first grooved surfaces is gradually increased along a direction parallel to the output axis toward the output-side cam disc to define a first included angle relative to the output axis. An outer diameter of each of the second toothed surfaces and the second grooved surfaces is gradually increased along the direction parallel to the output axis toward the input-side cam disc to define a second included angle relative to the output axis. The input unit includes an input disc, an eccentric shaft and a plurality of input rollers. The input disc has first and second input disc sides opposite to each other along the output axis. The input disc defines a disc hole which extends from the first input disc side to the second input disc side. The input disc further has an inner peripheral wall which extends from the second input disc side along the output axis and which engages with the input-side cam disc, and a plurality of first receiving grooves which extend radially and outwardly from the inner peripheral wall and which are formed circumferentially, angularly and equidistantly spaced apart from one another. The first receiving grooves are respectively registered with and spatially communicate with the first grooved surfaces to cooperatively define a plurality of receiving spaces. The eccentric shaft extends through the disc hole and the axial hole, and has an input shaft end which extends along an eccentric axis parallel to the output axis and which is rotated to drive rotation of the transmission unit in an eccentric cam motion. The input rollers are rollably disposed in the receiving spaces, respectively, to be rollable on a first runway which surrounds an outer peripheral edge of the first toothed surfaces and the first grooved surfaces and which is recessed radially from the outer peripheral edge of the first toothed surfaces and the first grooved surface. The output unit includes an output disc and a plurality of output rollers. The output disc has first and second output disc sides opposite to each other along the output axis and distal from and proximate to the input disc, respectively, an inner peripheral wall which extends from the second output disc side along the output axis toward the first output disc side and which engages with the output-side cam disc, and a plurality of second receiving grooves which extend radially and outwardly from the inner peripheral wall and which are formed circumferentially, angularly and equidistantly spaced apart from one another. The second receiving grooves are respectively registered with and spatially communicate with the second grooves to cooperatively define a plurality of accommodation spaces. The output rollers are rollably disposed in the accommodation spaces, respectively, to be rollable on a second runway which surrounds an outer peripheral edge of the second toothed surfaces and the second grooved surfaces and which is recessed radially from the outer peripheral edge.

Through the rotation of the transmission unit by the eccentric shaft, with the input rollers and the output rollers only disposed in a rollable manner, and with the inclination configuration of the input-side cam disc and the output-side cam disc, the output disc is rotated relative to the input disc at a reduced speed, and the transmission efficiency of the input energy and the output energy is optimized. The conjugate cam reducer has a simple component arrangement. The input disc and the output disc are made in a simple manufacturing process without the need for highly difficult finishing processes to be performed so as to facilitate miniaturization. With the only rollable arrangement of the input rollers and the output rollers, the input rollers and the output rollers are available and easily assembled so as to further facilitate the reduction of the reducer's size.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
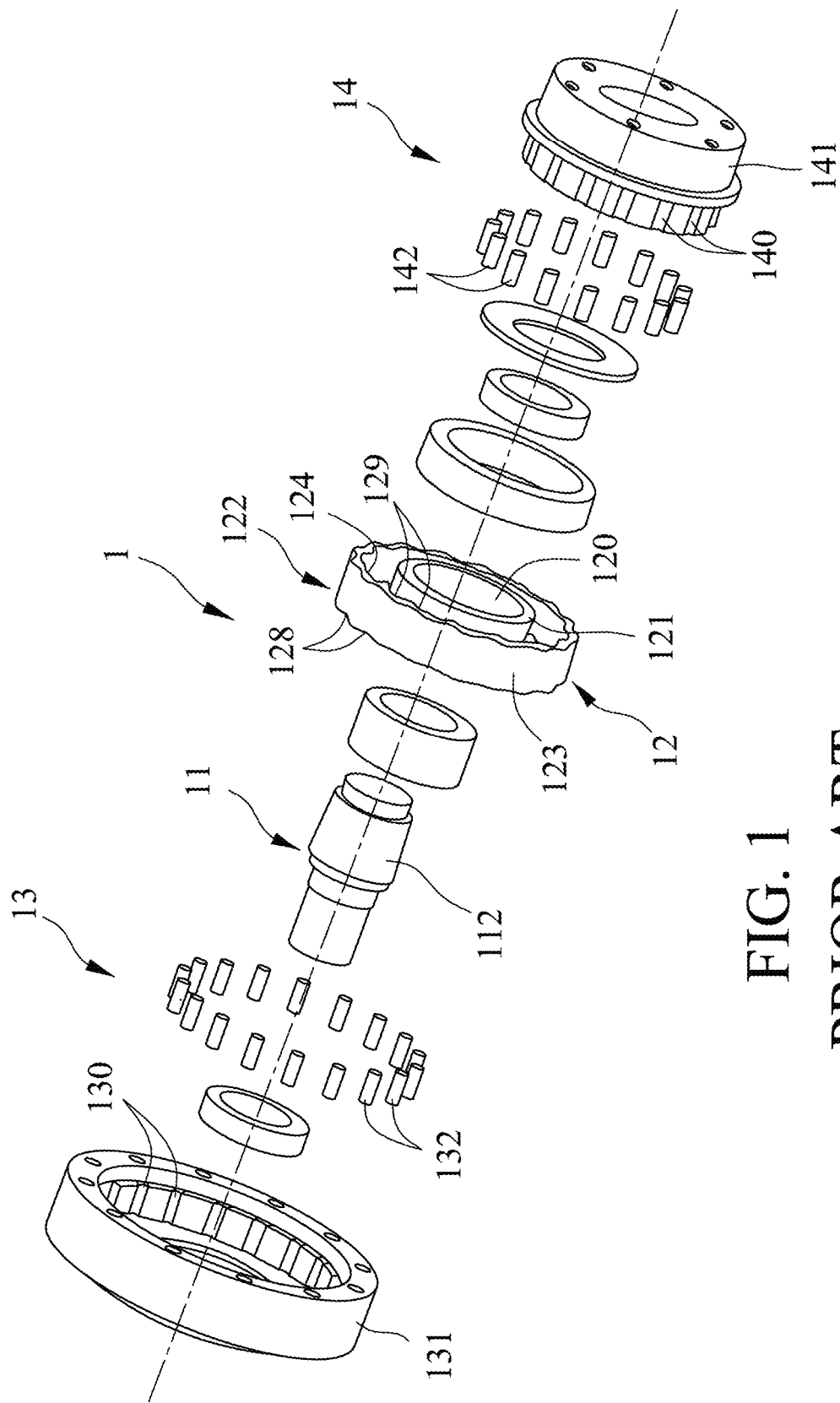
FIG. 1 is an exploded perspective view of a conventional cycloid speed reducer disclosed in TWI738015.
Figure 2:
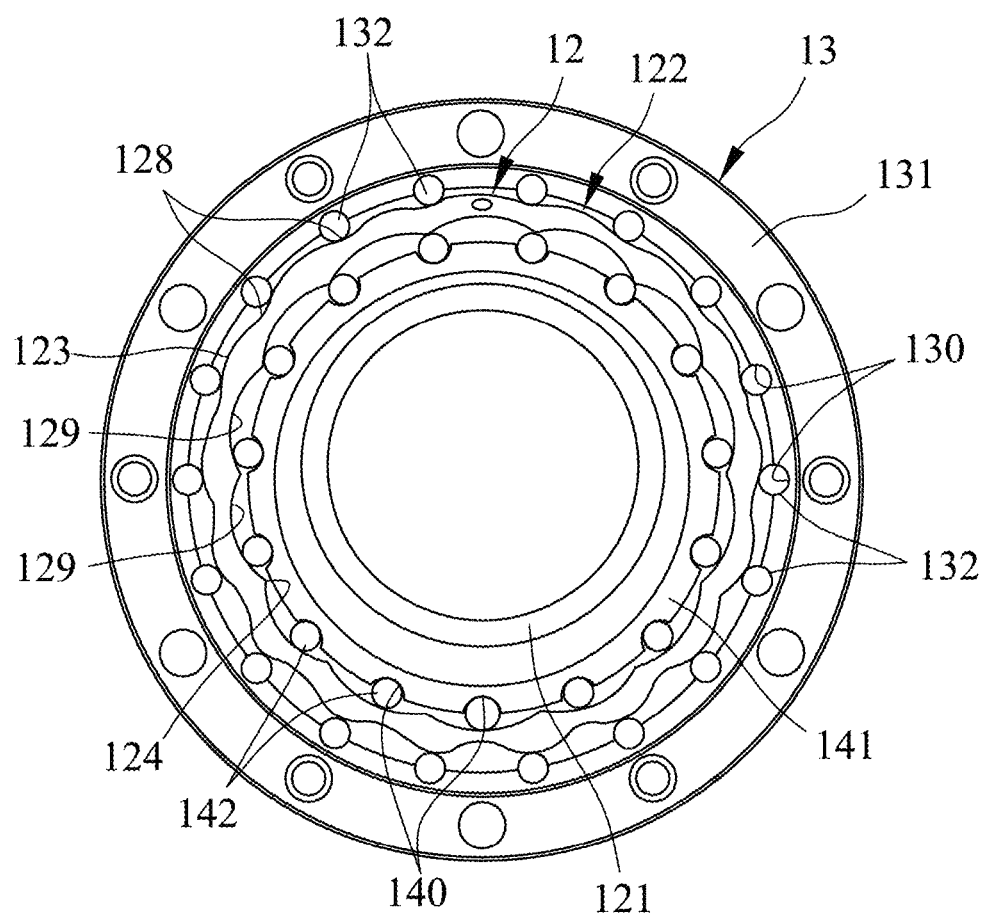
FIG. 2 is a schematic side view of the conventional cycloid speed reducer.
Figure 3:
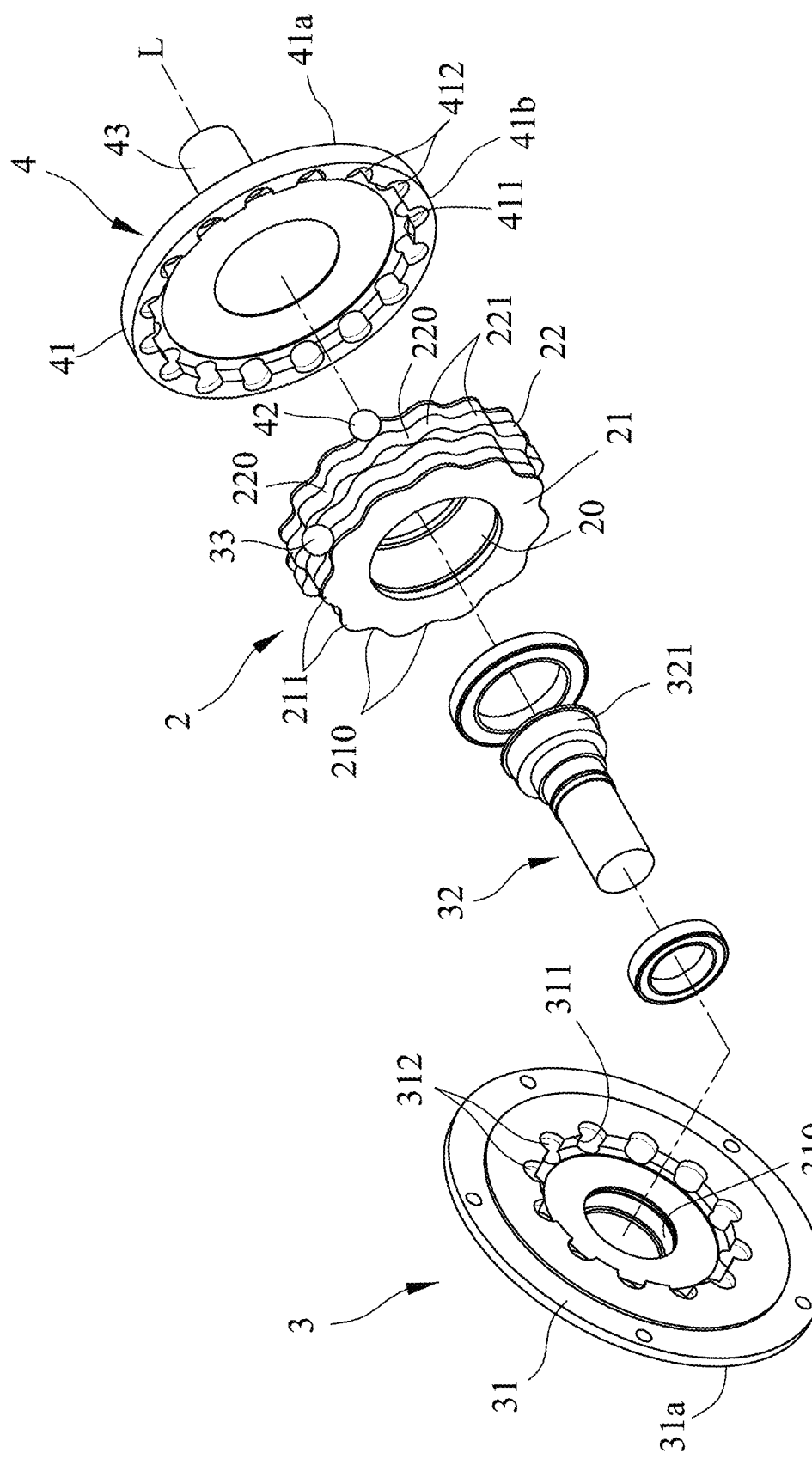
FIG. 3 is an exploded perspective view illustrating an embodiment of a conjugate cam reducer according to the disclosure.
Figure 4:
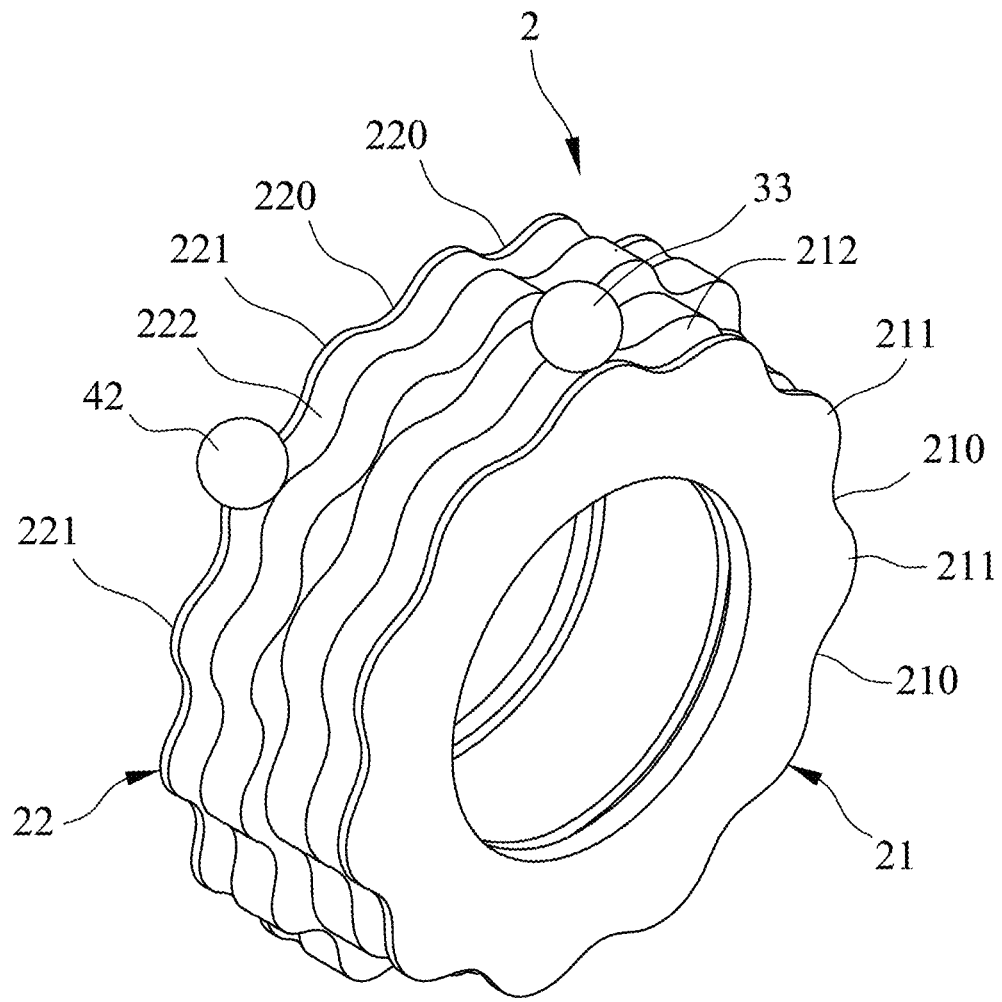
FIG. 4 is a perspective view of a transmission unit of the embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 3 to 6, an embodiment of a conjugate cam reducer according to the disclosure includes a transmission unit 2 which defines an axial hole 20 that extends along an output axis (L), and an input unit 3 and an output unit 4 which are connected with the transmission unit 2 and respectively disposed at two opposite sides of the transmission unit 2 along the output axis (L). The input unit 3 is coupled with and driven by a power, such as a motor. The drive from the input unit 3 is transmitted through the transmission unit 2 to the output unit 4 at a reduced speed.

The transmission unit 2 includes an input-side cam disc 21 and an output-side cam disc 22 which is securely connected with and extends from a side of the input-side cam disc 21 along the output axis (L), and which has an outer diameter larger than that of the input-side cam disc 21. Specifically, the input cam disc 21 is integrally and coaxially formed with the output-side cam disc 22 so as to form the transmission unit 2 as a conjugate cam piece with smaller-diameter and larger-diameter segments. The input-side cam disc 21 has a plurality of first toothed surfaces 211 which are formed circumferentially and angularly spaced apart from one another in an equidistant manner, and a plurality of first grooved surfaces 210 each of which engages two adjacent ones of the first toothed surfaces 211. The input-side cam disc 21 is formed with a first runway 212 which surrounds an outer peripheral edge of the first toothed surfaces 211 and the first grooved surfaces 210 and which is recessed radially from the outer peripheral edge of the first toothed surfaces 211 and the first grooved surface 210. The output-side cam disc 22 has a plurality of second toothed surfaces 221 which are formed circumferentially and angularly spaced apart from one another in an equidistant manner, and a plurality of second grooved surfaces 220 each of which engages two adjacent ones of the second toothed surfaces 221. The output-side cam disc 22 is formed with a second runway 222 which surrounds an outer peripheral edge of the second toothed surfaces 221 and the second grooved surfaces 220 and which is recessed radially from the outer peripheral edge of the second toothed surfaces 221 and the second grooved surfaces 220. It is noted that the first toothed surfaces 211 may have the same interval as the second toothed surfaces 221. Hence, in accordance with the diameters of the input-side cam disc 21 and the output-side cam disc 22, a predetermined number of the first grooved surfaces 210 and a predetermined number of the second grooved surfaces 220 may be respectively formed in the outer peripheral walls of the input-side cam disc 21 and the output-side cam disc 22 so as to simplify the manufacturing process of the transmission unit 2.

Figure 5:
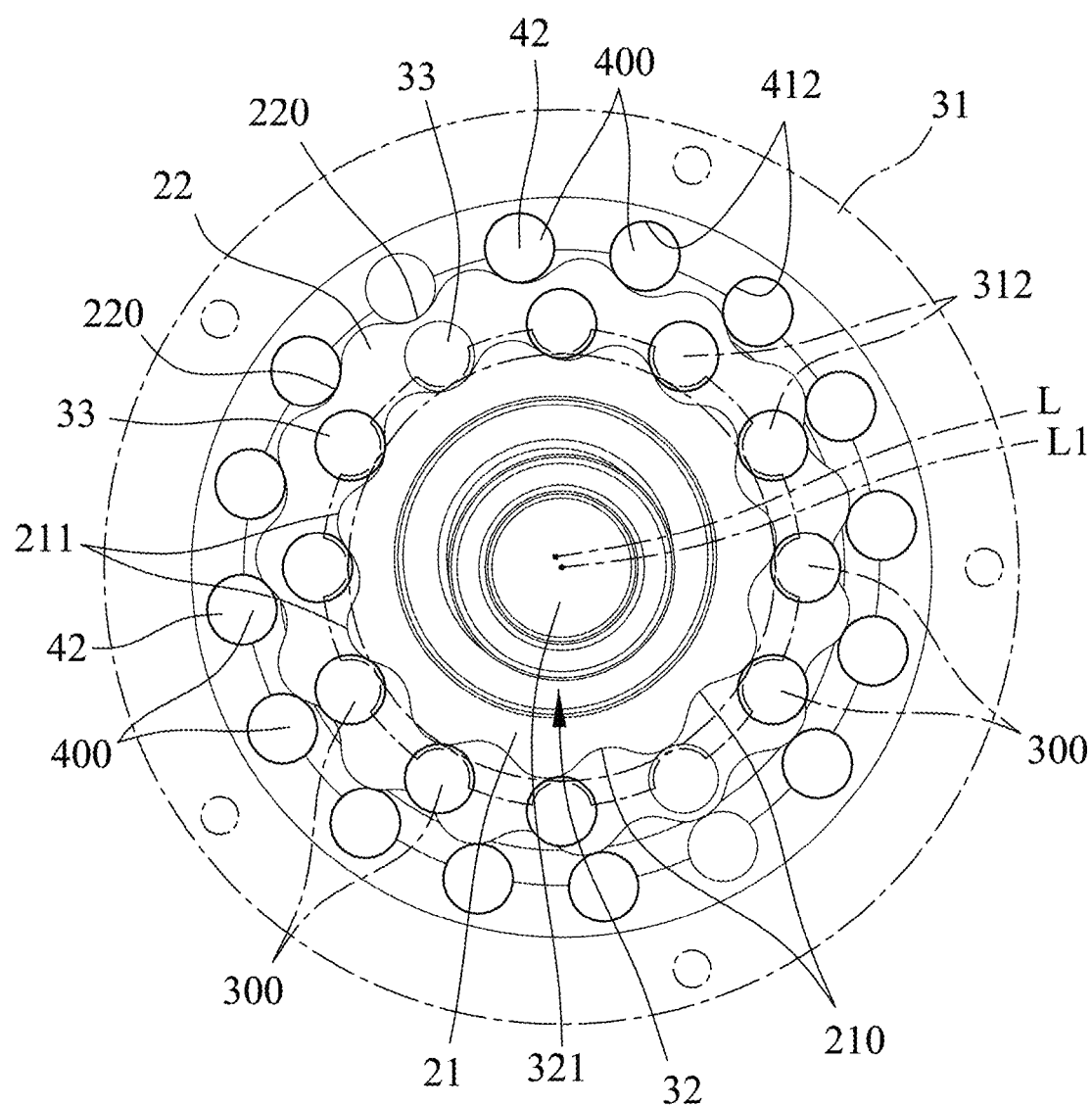
FIG. 5 is a schematic side view of an input unit and an output unit of the embodiment.

The input unit 3 includes an input disc 31, an eccentric shaft 32 and a plurality of input rollers 33. The input disc 31 is adapted to be connected with a housing (not shown) to cooperatively define an accommodation chamber for accommodating the transmission unit 2. The input disc 31 has first and second input disc sides (31a, 31b) opposite to each other along the output axis (L). The input disc 31 defines a disc hole 310 which extends from the first input disc side (31a) to the second input disc side (31b). The input disc 31 has an inner peripheral wall 311 which extends from the second input disc side (31b) along the output axis (L) and which engages with the input-side cam disc 21, and a plurality of first receiving grooves 312 which extend radially and outwardly from the inner peripheral wall 311 and which are formed circumferentially and angularly spaced apart from one another in an equidistant manner about the output axis (L). With reference to FIG. 5, the eccentric shaft 32 extends through the disc hole 310 and the axial hole 20, and has an input shaft end 321 which extends along an eccentric axis (L1) parallel to and offset from the output axis (L) and which is rotated to drive rotation of the transmission unit 2 in an eccentric cam motion. The first receiving grooves 312 are respectively registered with and spatially communicate with the first grooved surfaces 210 to cooperatively define a plurality of receiving spaces 300 which are formed circumferentially and angularly spaced apart from one another in an equidistant manner about the output axis (L). Each of the first receiving grooves 312 has a cross-section which is of one of a trapezoidal, a circular and a Gothic arch shape. Each input roller 33 may be in the form of a metal spherical ball which are widely available. The input rollers are rollably disposed in the receiving spaces 300, respectively. Thus, no retaining structure is needed to accommodate and confine the input rollers 33 within certain configurations, thereby simplifying the manufacturing process.

The output unit 4 includes an output disc 41, a plurality of output rollers 42 and an output shaft 43. The output disc 41 has first and second output disc sides (41a, 41b) opposite to each other along the output axis (L) and distal from and proximate to the input disc 31, respectively, an inner peripheral wall 411 which extends from the second output disc side (41b) along the output axis (L) toward the first output disc side (41a) and which engages with the output-side cam disc 22, and a plurality of second receiving grooves 412 which extend radially and outwardly from the inner peripheral wall 411 and which are formed circumferentially and angularly spaced apart from one another in an equidistant manner about the output axis (L). The second receiving grooves 412 are respectively registered with and spatially communicate with the second grooved surfaces 220 to cooperatively define a plurality of accommodation spaces 400 which are formed circumferentially and angularly spaced apart from one another in an equidistant manner about the output axis (L). Each second receiving groove 412 has a cross-section which is of one of trapezoidal, circular and Gothic arch shapes. Each output roller 42 may be in the form of a metal spherical ball which are easily available. The output rollers 42 are rollably disposed in the accommodation spaces 400, respectively. Thus, no retaining structure is needed to accommodate and confine the output rollers 42 within certain configurations, thereby simplifying the manufacturing process. The output shaft 43 extends from the first output disc side (41a) of the output disc 41 along the output axis (L) and away from the transmission unit 2.

Figure 6:
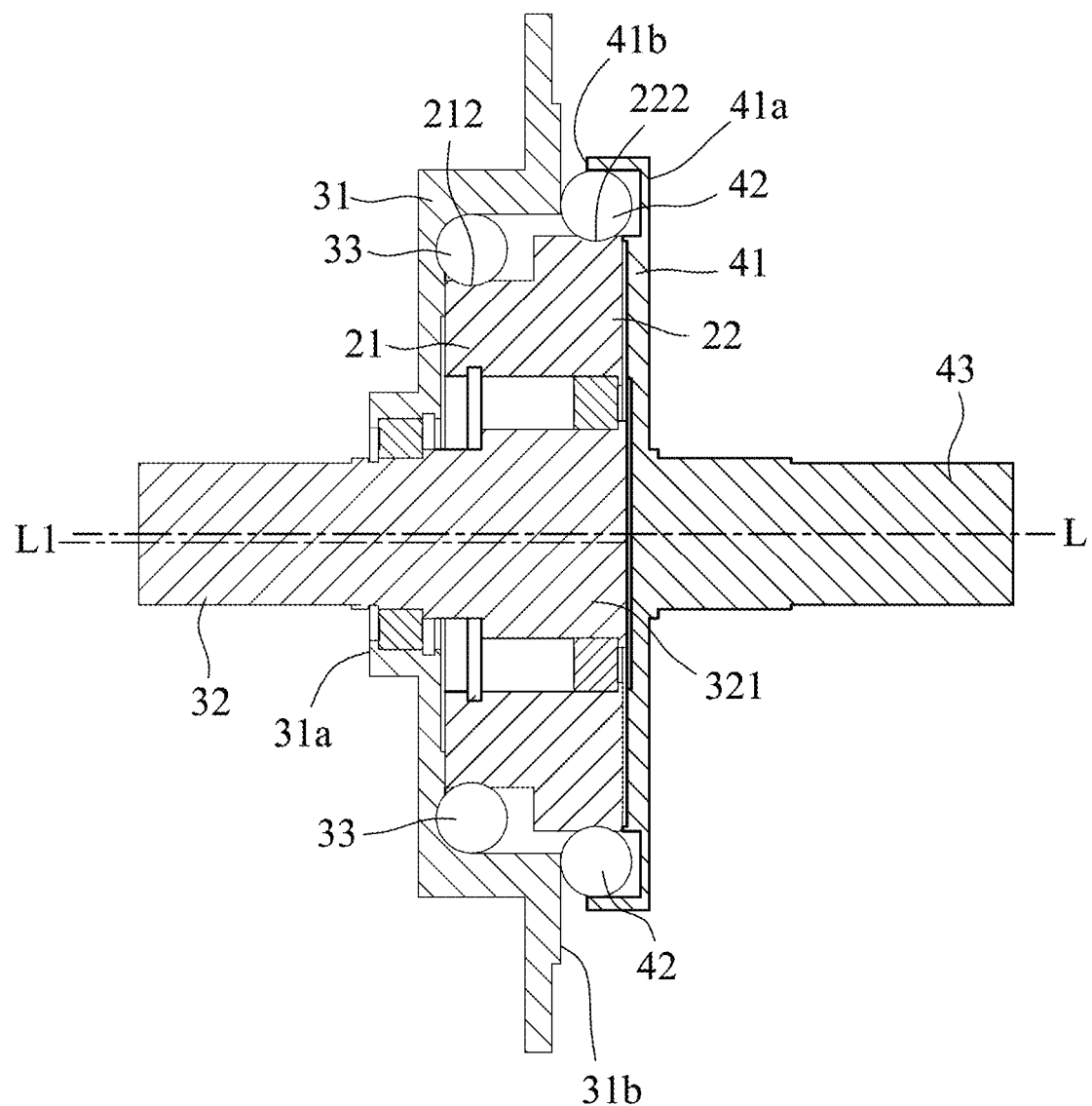
FIG. 6 is a sectional view of the embodiment.

In this embodiment, the input unit 3 and the output unit 4 are disposed at two opposite sides of the transmission unit 2 to have the input-side cam disc 21 of the transmission unit 2 radially facing the inner peripheral wall 311 of the input disc 3, and the output-side cam disc 22 of the transmission unit 2 radially facing the inner peripheral wall 411 of the output disc 41. Rotation of the eccentric shaft 32 results in rotation of both the input-side cam disc 21 and the output-side cam disc 22 of the transmission unit 2. As shown in FIG. 6, the first runway 212 has a first width which is measured in the direction parallel to the output axis (L) and which is 0.5-0.58 time an outer diameter of each input roller 33, and the second runway 222 has a second width which is measured in the direction parallel to the output axis (L) and which is 0.5-0.58 times an outer diameter of each output roller 42. For example, the first width of the first runway 212 is 0.5 time the outer diameter of each input roller 33, and the second width of the second runway 222 is 0.5 time the outer diameter of each output roller 42. That is, the first width of the first runway 212 and the second width of the second runway 222 are the same as the radius of each input roller 33 and the radius of each outer roller 42, respectively. During the rotation of the transmission unit 2 about the output axis (L), the input rollers 33 are only rollable on the first runway 212, and output rollers 42 are only rollable on the second runway 222 so as to serve as a contact medium disposed between the input disc 31 and the input-side cam disc 21, and between the output-side cam disc 22 and the output disc 41. With the input-side cam disc 21 having a diameter different from that of the output-side cam disc 22, the rotational energy of the eccentric shaft 32 is transmitted to the output shaft 43, causing the output shaft 43 to rotate at a predetermined reduced speed.

In this embodiment, aside from the input rollers 33 and the output rollers 42, the reducer only includes four component parts which are the input disc 31, the eccentric shaft 32, the transmission unit 2 and the output disc 41, and has a simple component arrangement. Moreover, the input disc 31 is formed with the first receiving grooves 312 and the output disc 41 is formed with the second receiving grooves 412, which can be machined in a simple manufacturing process without the need for highly difficult finishing processes to be performed, and may facilitate the miniaturization of the reducer. Thus, with the rollable arrangement of the input rollers 33 and the output rollers 42 with a sufficient and appropriate contact area of the first runway 212 and the second runway 222, damage to the input rollers 33 and the output rollers 42 due to a large contact stress is avoided to ensure a successful operation of the conjugate cam reducer, and the input rollers 33 and the output rollers 42 are available and easily assembled so as to further facilitate reducing the size of the reducer.

Alternatively, each of the input rollers 33 and each of the output rollers 42 may be in the form of cylindrical rollers each of which extends in a direction parallel to the output axis (L).

Figure 7:
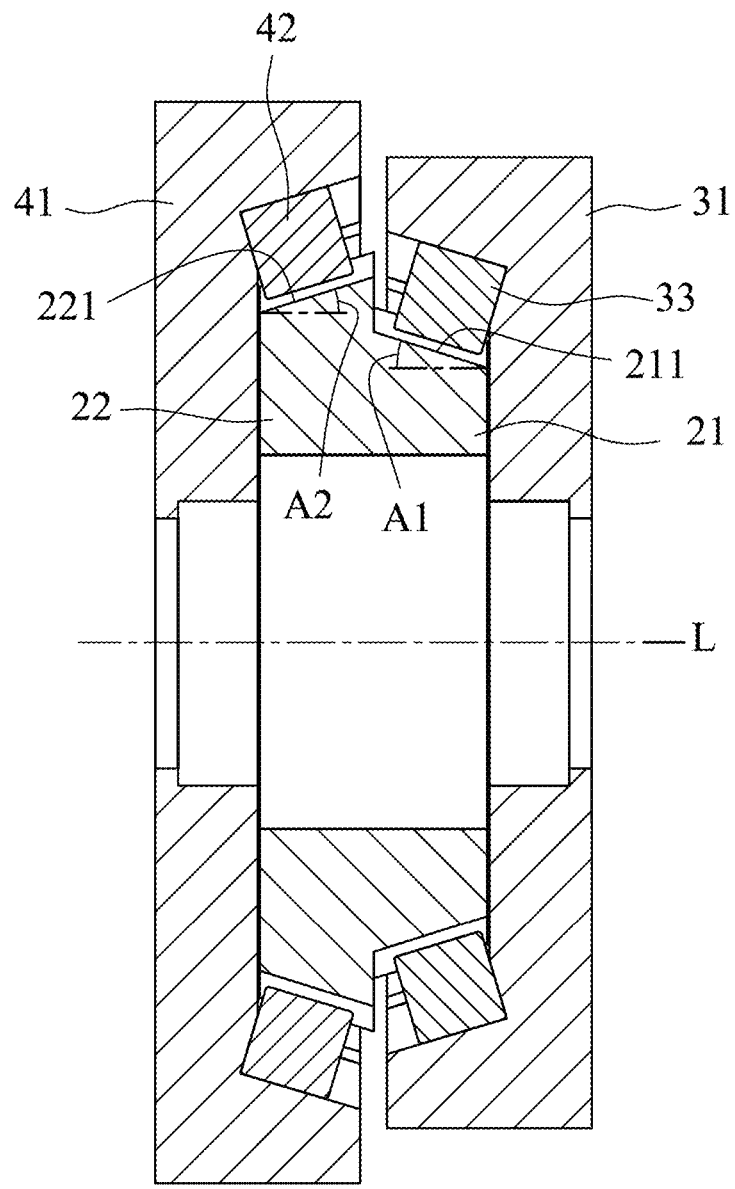
FIG. 7 is an enlarged sectional view illustrating an input unit and an output unit of a modified embodiment.

With reference to FIG. 7, in a modified embodiment, an outer diameter of each of the first toothed surfaces 211 and the first grooved surfaces 210 is gradually increased along a direction parallel to the output axis (L) toward the output-side cam disc 22 to define a first included angle (A1) relative to the output axis (L), and an outer diameter of each of the second toothed surfaces 221 and the second grooved surfaces 220 is gradually increased along the direction parallel to the output axis (L) toward the input-side cam disc 21 to define a second included angle (A2) relative to the output axis (L). Each of the first included angle (A1) and the second included angle (A2) ranges from 0 to 45 degrees. For example, each of the first included angle (A1) and the second included angle (A2) is 25 degrees, and each of the input rollers 33 and each of the output rollers 42 are in the form of cylindrical rollers each of which extends in a direction slightly inclined to the output axis (L).

With the inclined configuration of the input-side cam disc 21 and the output-side cam disc 22, a holding force is generated between the input-side cam disc 21 and the input disc 31, and a holding force is generated between the output-side cam disc 22 and the output disc 41 to hold the transmission unit 2 during rotation so as to prevent movement of the transmission unit 2 along the direction parallel to the output axis (L). Additionally, through adjustment of the first included angle (A1) and the second included angle (A2), the relative position of the input rollers 33 and the output rollers 42, an undesired clearance and interference therebetween can be avoided to improve the output accuracy and smooth operation of the conjugate cam reducer and optimize the transmission efficiency of the input energy and the output energy.

As illustrated, the conjugate cam reducer has a simple structure, and the input rollers 33 and the output rollers 42 are only disposed in a rollable manner, which simplifies the manufacturing and assembling processes and meets the requirements for miniaturization.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A conjugate cam reducer comprising:
    a transmission unit defining an axial hole which extends along an output axis, and including an input-side cam disc and an output-side cam disc which extends from a side of said input-side cam disc along the output axis, said input-side cam disc having a plurality of first toothed surfaces which are formed circumferentially, angularly and equidistantly spaced apart from one another, and a plurality of first grooved surfaces each of which engages two adjacent ones of said first toothed surfaces, said output-side cam disc having a plurality of second toothed surfaces which are formed circumferentially, angularly and equidistantly spaced apart from one another, and a plurality of second grooved surfaces each of which engages two adjacent ones of said second toothed surfaces, wherein an outer diameter of each of said first toothed surfaces and said first grooved surfaces is gradually increased along a direction parallel to the output axis toward said output-side cam disc to define a first included angle relative to the output axis, and an outer diameter of each of said second toothed surfaces and said second grooved surfaces is gradually increased along the direction parallel to the output axis toward said input-side cam disc to define a second included angle relative to the output axis;
    an input unit connected with said transmission unit at a side thereof, and including
        an input disc having first and second input disc sides opposite to each other along the output axis, said input disc defining a disc hole which extends from said first input disc side to said second input disc side, said input disc further having an inner peripheral wall which extends from said second input disc side along the output axis and which engages with said input-side cam disc, and a plurality of first receiving grooves which extend radially and outwardly from said inner peripheral wall and which are formed circumferentially, angularly and equidistantly spaced apart from one another, said first receiving grooves being respectively registered with and spatially communicate with said first grooved surfaces to cooperatively define a plurality of receiving spaces,
        an eccentric shaft extending through said disc hole and said axial hole, and having an input shaft end which extends along an eccentric axis parallel to the output axis and which is rotated to drive rotation of said transmission unit in an eccentric cam motion, and
        a plurality of input rollers rollably disposed in said receiving spaces, respectively; and
    an output unit connected with said transmission unit at an opposite side of said transmission unit opposite to said input unit, and including
        an output disc having first and second output disc sides opposite to each other along the output axis and distal from and proximate to said input disc, respectively, an inner peripheral wall which extends from said second output disc side along the output axis toward said first output disc side and which engages with said output-side cam disc, and a plurality of second receiving grooves which extend radially and outwardly from said inner peripheral wall and which are formed circumferentially, angularly and equidistantly spaced apart from one another, said second receiving grooves being respectively registered with and spatially communicate with said second grooved surfaces to cooperatively define a plurality of accommodation spaces, and
        a plurality of output rollers rollably disposed in said accommodation spaces, respectively.

2. The conjugate cam reducer of claim 1, wherein each of said first included angle and said second included angle ranges from 0 to 45 degrees.

3. The conjugate cam reducer of claim 1, wherein each of said input rollers and each of said output rollers are in form of spherical balls.

4. The conjugate cam reducer of claim 1, wherein each of said input rollers and each of said output rollers are in form of cylindrical rollers each of which extends in the direction parallel to the output axis.

5. The conjugate cam reducer of claim 1, wherein said output unit further includes an output shaft which extends from said first output disc side of said output disc along the output axis and away from said transmission unit.

6. The conjugate cam reducer of claim 2, wherein said input-side cam disc is formed with a first runway which surrounds an outer peripheral edge of said first toothed surfaces and said first grooved surfaces and which is recessed radially from said outer peripheral edge, said output-side cam disc being formed with a second runway which surrounds an outer peripheral edge of said second toothed surfaces and said second grooved surfaces and which is recessed radially from said outer peripheral edge, said input rollers being rollable on said first runway, said output rollers being rollable on said second runway.

7. The conjugate cam reducer of claim 6, wherein said first runway has a first width which is measured in the direction parallel to the output axis and which is 0.5-0.58 times an outer diameter of each of said input rollers, and said second runway has a second width which is measured in the direction parallel to the output axis and which is 0.5-0.58 times an outer diameter of each of said output rollers.

8. The conjugate cam reducer of claim 1, wherein said output-side cam disc has an outer diameter larger than that of said input-side cam disc.

* * * * *